United States Patent [19]
Soeder

[11] Patent Number: 6,055,532
[45] Date of Patent: *Apr. 25, 2000

[54] METHOD AND APPARATUS FOR RECORDING AND READING DATE DATA HAVING COEXISTING FORMATS

[76] Inventor: Thomas B. Soeder, 3232 Rosemary La., West Friendship, Md. 21794

[*] Notice: This patent is subject to a terminal disclaimer.

[21] Appl. No.: 09/001,939

[22] Filed: Dec. 31, 1997

Related U.S. Application Data

[63] Continuation-in-part of application No. 08/645,822, May 14, 1996, Pat. No. 5,644,762.

[51] Int. Cl.⁷ .................................................. G06F 13/30
[52] U.S. Cl. ............................................... 707/6; 707/101
[58] Field of Search ........................................ 707/6, 101

[56] References Cited

U.S. PATENT DOCUMENTS

| | | | |
|---|---|---|---|
| 3,996,450 | 12/1976 | Kerkhoff | 235/380 |
| 4,044,347 | 8/1977 | Van Voorhis . | |
| 4,654,633 | 3/1987 | Tonomura . | |
| 4,752,765 | 6/1988 | Larson . | |
| 4,947,163 | 8/1990 | Henderson et al. | 340/825.31 |
| 5,119,465 | 6/1992 | Jack et al. | 395/500 |
| 5,293,355 | 3/1994 | Widen et al. | 368/19 |
| 5,319,779 | 6/1994 | Chang et al. | 395/600 |
| 5,444,820 | 8/1995 | Tzes et al. | 395/22 |
| 5,644,762 | 7/1997 | Soeder | 707/6 |
| 5,737,735 | 4/1998 | Soeder | 70/6 |
| 5,812,841 | 9/1998 | Soeder | 707/6 |

FOREIGN PATENT DOCUMENTS 5-327518  12/1993  Japan .

OTHER PUBLICATIONS

Hart et al. A Scaleable, Automated Process for Year 2000 System Correction, PROC 18th International Conference on Software Engineering, Mar. 25–30, 1996, p. 475–84.

*Primary Examiner*—Wayne Amsbury
*Attorney, Agent, or Firm*—Stevens, Davis, Miller & Mosher, L.L.P.

[57] ABSTRACT

Years past 1999 are stored as binary integers or in other coding schemes not reserved by ASCII or EBCDIC in fields previously reserved for representations of years as two decimal digits. The binary integers occupy ranges of values for the fields which are not used by an integer value corresponding to any possible combination of two decimal digits from 00 to 99. Data written in binary format and data written in a conventional format such as ASCII can be distinguished in various ways, such as by determining whether the year datum has a binary integer value falling inside or outside the range for possible ASCII combinations of two digits, or testing the bit having a place value of 4,096. If this bit is tested, it will always be on (one) for data written in ASCII and off (zero) for all binary integer values from zero through 4,095. In this way, data using integer-encoded years and years represented by the last two decimal digits will be able to coexist for at least ten thousand years.

6 Claims, 4 Drawing Sheets

METHOD AND APPARATUS FOR RECORDING AND READING DATE DATA HAVING COEXISTING FORMATS

This is a continuation-in-part of Ser. No. 08/645,822, filed May 14, 1996, now U.S. Pat. No. 5,644,762, the disclosure of which is hereby incorporated by reference in its entirety into the present disclosure.

FIELD OF THE INVENTION

The invention is directed to a computer-implemented process of reading dates both before and after Dec. 31, 1999, in existing computer-readable storage media (floppy disks, hard disks, RAM, ROM, tape media, or the like).

DESCRIPTION OF THE RELATED ART

In many computer applications, dates are represented in six-digit form by a concatenation of the last two digits of the year and digits representing the month and day. For example, in such applications, the date May 10, 1996, is represented as 960510 or 051096 or Julian day plus 96. Each of the six digits is stored in eight bits in an appropriate storage medium in accordance with a known computer character set. One such character set, used by both IBM-compatible PC's and Macintoshes and known as ASCII (American Standard Code for Information Interchange), maps numeric digits 0 through 9 to a single eight-bit byte with a bit pattern of 0011 0000 through 0011 1001. Another such character set, used by IBM mainframes and known as EBCDIC, maps numeric digits 0 through 9 to a single eight-bit byte with a bit pattern of 1111 0000 through 1111 1001. Thus, in ASCII, the date May 10, 1996, is stored in a bit pattern of 0011 1001 0011 0110 0011 0000 0011 0101 0011 0001 0011 0000, so that the fear 1996 is represented as a bit pattern of 0011 1001 0011 0110, while in EBCDIC, the date May 10, 1996 is stored as a bit pattern of 1111 1001 1111 0110 1111 0000 1111 0101 1111 0001 1111 0000, so that the year 1996 is represented as a bit pattern of 1111 1001 1111 0110. If the date is represented in the format 051096, the first two bytes (16 bits) will be moved to be the last two bytes (16 bits). Eight-bit character sets have traditionally been favored because they can represent every character of a given character set and still have room left over for computing device instructions, control codes, line-draw characters, or accented letters.

While the representation of dates described above works for all dates from Jan. 1, 1900, through Dec. 31, 1999, it cannot store subsequent dates without confusion, inasmuch as there is no provision for distinguishing, for example, May 10, 2096, from May 10, 1996.

One solution would be to extend the date fields in databases from six bytes to eight.

SUMMARY OF THE INVENTION

An object of the invention is to allow recording of dates beginning with Jan. 1, 2000, in computer-readable storage media without confusion and without the need to rewrite existing information.

To achieve this and other objects, the invention is directed to a process for distinguishing data written in a conventional format such as ASCII or EBCDIC (hereafter known as "legacy data") from data written in a new format such as binary (hereafter known as "enterprise data"). A year datum is read out and tested to determine whether it is in a format for legacy data or a format for enterprise data. If the year datum is determined to be in the format for legacy data, the year is determined from the year datum in accordance with a first encoding scheme (which may be ASCII, EBCDIC, or the like). If the year datum is determined to be in the format for enterprise data, the year is determined from the year datum in accordance with a second encoding scheme.

According to the present invention, legacy data and enterprise data can coexist without ambiguity for the following reason. In the prior art scheme described above, whichever character set is used for mapping digits 0 through 9, the range of two-byte sequences needed to represent all sets of two digits from 00 through 99 is a small subset of all possible two-byte sequences; this range has as its bounds the two-byte sequences needed to represent 00 and 99. For example, in ASCII, the range is 0011 0000 0011 0000 through 0011 1001 0011 1001 inclusive. Similarly, in EBCDIC, the range is 1111 0000 1111 0000 through 1111 1001 1111 1001 inclusive. Thus, even if both ASCII and EBCDIC are in use, all two-byte sequences falling outside these ranges are unused.

The significance of this realization becomes even more striking when the integer values of the two-byte sequences are expressed in base 10. A sequence of two eight-bit bytes can represent any value from zero through $2^{16}-1=65,535$. The integer values of ASCII 00 and ASCII 99 are 12,336 and 14,649, respectively. The integer values of EBCDIC 00 and EBCDIC 99 are 61,680 and 63,993, respectively. That is, the ranges 0–12,335, 14,650–61,679 and 63,994–65,535 are unused.

The invention achieves the above-described object by using at least one of these unused ranges to integrate at least two formats for encoding the year data in the following manner. Legacy data remain unchanged. For enterprise data, i.e., after Dec. 31, 1999, the year is represented in a format such that the bit stream falls outside the range used for ASCII, the range used for EBCDIC, or both ranges as needed. For example, the integer value of the year number is represented in binary format, and the binary representation is written in the two bytes already allocated for the year. At the very least, using the range 0–12,335, all years from one through 12,335 can be represented in this manner without conflict with existing date data. As an example, the year 2096 is represented as 0000 1000 0011 0000.

In reading out a date according to a first embodiment, first, the integer value of the two bytes of data written into the year value is determined. If this integer value is below 12,336, the integer value itself is taken to be the number of the year. If this integer value is in the range from 12,336 through 14,649 inclusive, the year is determined to have been written in ASCII format and is treated accordingly. If this integer value is in the range from 61,680 through 63,993 inclusive, the year is determined to have been written in EBCDIC and is treated accordingly. Of course, the ranges 14,650–1,679 and 63,994–65,535 could be similarly used.

In reading out a date according to a second embodiment, one or more bits of the year datum are tested or examined. For instance, the bit having a place value of 4,096 is always off (zero) for a binary value between zero and 4,095, while it is always on (one) for an ASCII or EBCDIC encoding of any two digits from 00 through 99. Thus, testing the 4,6 bit distinguishes between legacy and enterprise data. Of course, another bit or bits could be similarly tested, as required by the specific encoding schemes used for legacy and enterprise data.

BRIEF DESCRIPTION OF THE DRAWINGS

The invention will now be disclosed in detail with reference to the drawings, in which

FIG. 4 shows a computing device for implementing the invention. Computing device 400 includes storage 402 for storing the data records of FIG. 3. Read/write device 404 reads from and writes to the storage under control of a processor such as microprocessor 406, thus allowing data exchange between the storage and the microprocessor. The microprocessor or other processor has logic circuitry with comparing capabilities 408 and year determining capabilities 410 for performing the operations of FIGS. 1 and 2. The computing device could be, e.g., an appropriately programmed IBM-compatible PC, Macintosh, mainframe or any sized computer (micro, mini, super and mainframe). The device can also include any or all of input 412 (e.g., a keyboard), printer 414 and display 416 as needed.

The second embodiment of the invention will now be disclosed with reference to the following table, which shows the encoding of years in various encoding schemes:

| Byte: | | | | | | | | Byte: | | | | | | | | | integer |
|---|---|---|---|---|---|---|---|---|---|---|---|---|---|---|---|---|---|
| F | E | D | C | B | A | 9 | 8 | 7 | 6 | 5 | 4 | 3 | 2 | 1 | 0 | hex code | value |
| 0 | 0 | 1 | 1 | 0 | 0 | 0 | 0 | 0 | 0 | 1 | 1 | 0 | 0 | 0 | 0 | ASCII 00 | 12,336 |
| 1 | 1 | 1 | 1 | 0 | 0 | 0 | 0 | 1 | 1 | 1 | 1 | 0 | 0 | 0 | 0 | EBCDIC 00 | 61,680 |
| 3 | 1 | 8 | 4 | 2 | 1 | 5 | 2 | 1 | 6 | 3 | 1 | 8 | 4 | 2 | 1 | Binary place values | |
| 2 | 6 | 1 | 0 | 0 | 0 | 1 | 5 | 2 | 4 | 2 | 6 | | | | | | |
| 7 | 3 | 9 | 9 | 4 | 2 | 2 | 6 | 8 | | | | | | | | | |
| 6 | 8 | 2 | 6 | 8 | 4 | | | | | | | | | | | | |
| 8 | 4 | | | | | | | | | | | | | | | | |
| 0 | 0 | 0 | 0 | 0 | 1 | 1 | 1 | 1 | 1 | 0 | 1 | 0 | 0 | 0 | 0 | Binary integer 2000 | |
| 0 | 0 | 0 | 0 | 1 | 1 | 1 | 1 | 1 | 1 | 1 | 1 | 1 | 1 | 1 | 1 | Binary integer 4095 | |

DETAILED DESCRIPTION OF THE PREFERRED EMBODIMENTS

Figure 1:
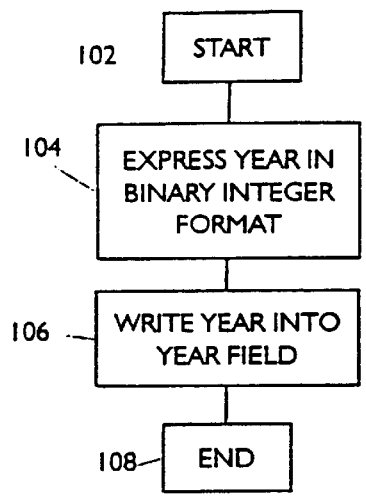
FIG. 1 is a flow chart showing the operation of writing a year in accordance with the invention.

FIG. 1 shows the operation of writing a year in accordance with the first embodiment of the invention. It is contemplated that this operation will be used on and after Jan. 1, 2000, although it could be implemented at any time.

The operation starts at step 102. In step 104, the year is expressed in binary integer format. In step 106, the year is written into the year field. The operation ends at step 106.

Figure 2:
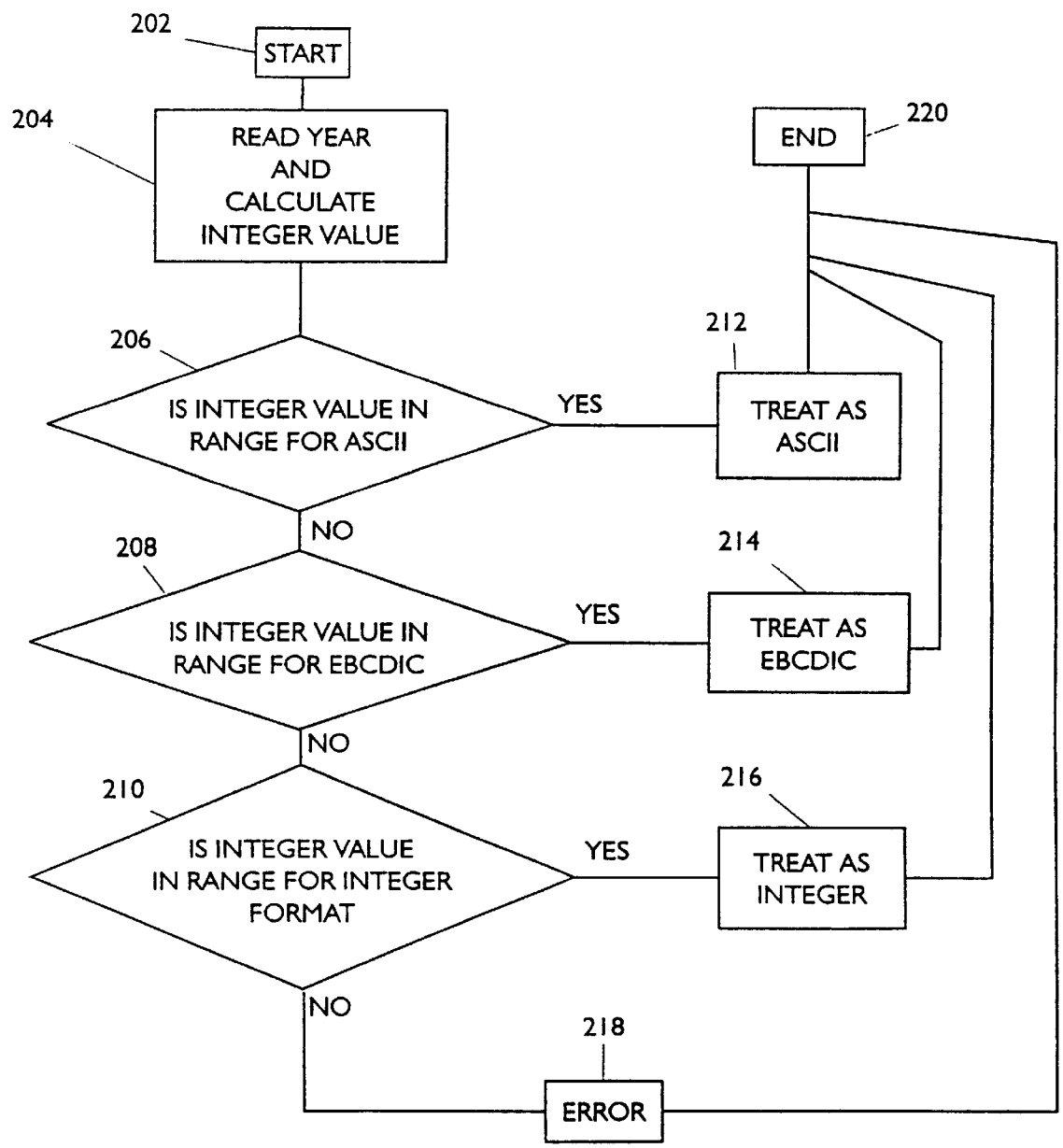
FIG. 2 is a flow chart showing the operation of reading a year in accordance with a first embodiment of the invention.

FIG. 2 shows the operation of reading a year in accordance with the first embodiment of the invention, and the integer value is calculated. The integer value is compared with the ranges for ASCII (step 206), EBCDIC (step 208) and the integer format described above for the invention (step 210) and is treated accordingly (steps 212–216). If the integer value falls outside any of these ranges, an error message is given (step 218). The operation then ends (step 220). Depending on the manner in which the three ranges outside both ASCII and ELCDIC are used, it may not be necessary to provide for an error message.

Figure 3:
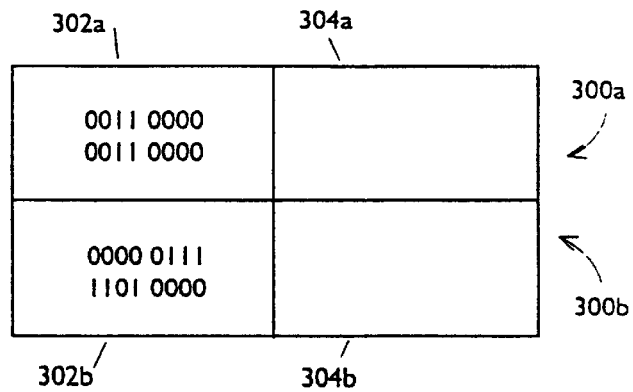
FIG. 3 shows sample data records.

FIG. 3 shows a data structure for use with the two operations described above. Data record 300a includes year field or datum 302a and other fields 304a; similarly, data record 300b includes year field or datum 302b and other fields 304b. The other fields can contain any information desired to be associated with the year. Year field 302a contains the bits 0011 0000 0011 0000. These bits correspond to ASCII 00 and are interpreted as indicating the year 1900. Year field 302b contains the bits 0000 0111 1101 0000. These bits lie outside the ranges for both ASCII and EBCDIC, but instead have an integer value of 2000 and are interpreted as indicating the year 2000.

In both ASCII and EBCDIC, in the byte representing every decimal digit from zero through nine, the higher-order four bits are constant, while the lower-order bits range from 0000 (zero) through 1001 (nine). Thus, in the ASCII representation of any two decimal digits, from 00 through 99, the highest-order four bits, which have place values of 32,768, 16,384, 8192 and 4096, are the same, and the same holds true for the EBCDIC representation of any two decimal digits, from 00 through 99. In particular, the bit having the place value 4,096 is always on. By contrast, for every binary integer from zero through 4,095, the bit having the place value 4,096 is off. Thus, by testing only that one bit, legacy data and enterprise data can be distinguished, as long as the binary integer value representing the year is below 4,096.

Figure 5:
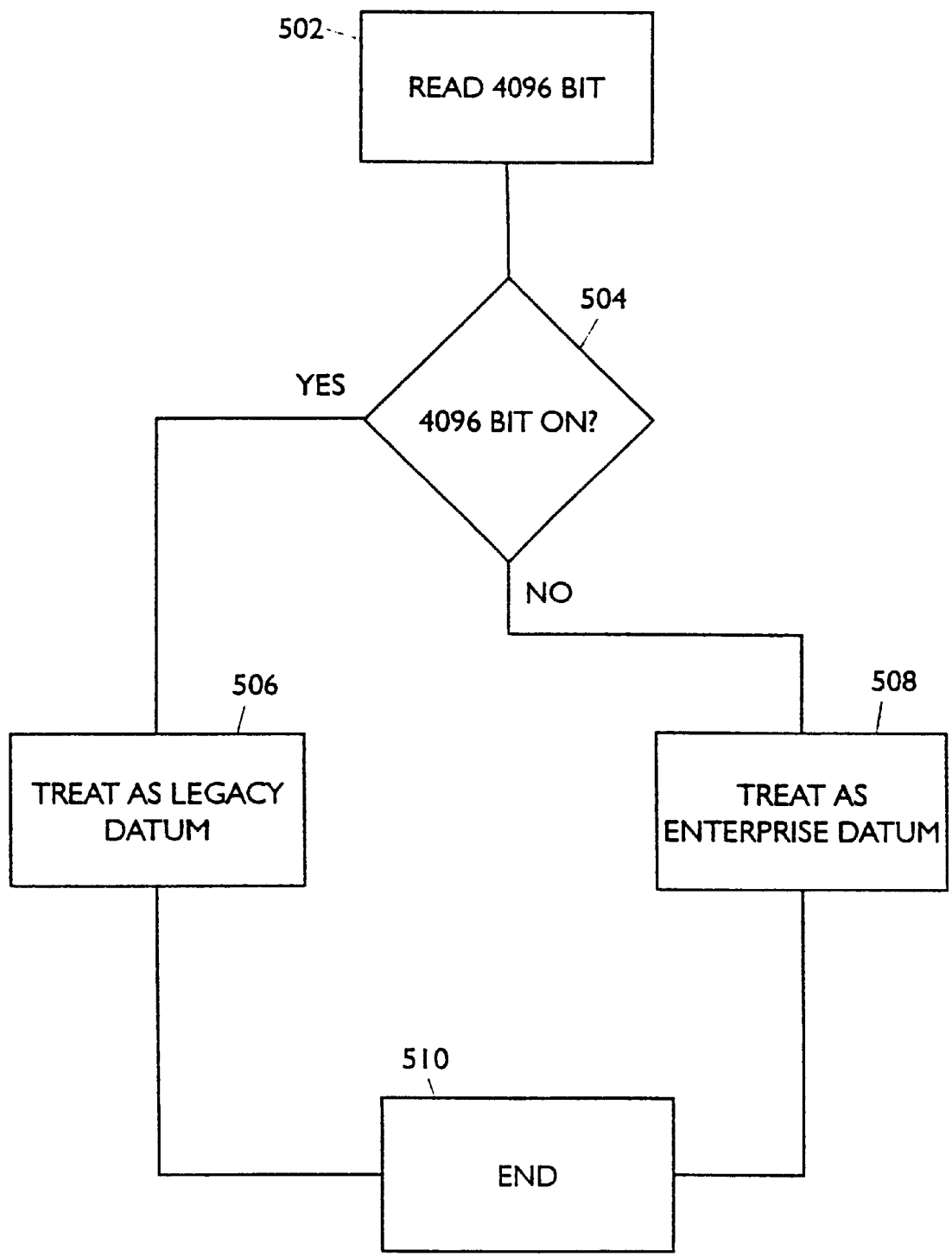
FIG. 5 is a flow chart showing the operation of reading a year in accordance with a second embodiment of the invention when legacy data are in one format.

In case the bit to be examined is the 4,096 bit, the determination proceeds as shown by the flow chart of FIG. 5. In step 502, the 4,096 bit is read. In step 504, it is determined whether this bit is on or off. If the bit is on, the year datum is treated as being a legacy datum in step 506, while if the bit is off, the year datum is treated as being an enterprise datum in step 508. Either way, the determination ends in step 510. If the bit to be examined is another bit, the operation is modified accordingly.

Of course, the 4,096 bit is not the only bit that can be tested. For example, it will be readily apparent from the table that the 8,192 bit can be tested instead, in which case the enterprise data can have binary integer values up to 8,191. If necessary, more than one bit can be tested. If it is known that all the legacy data are encoded in EBCDIC, any or all of the four highest-order bits can be tested.

Figure 6:
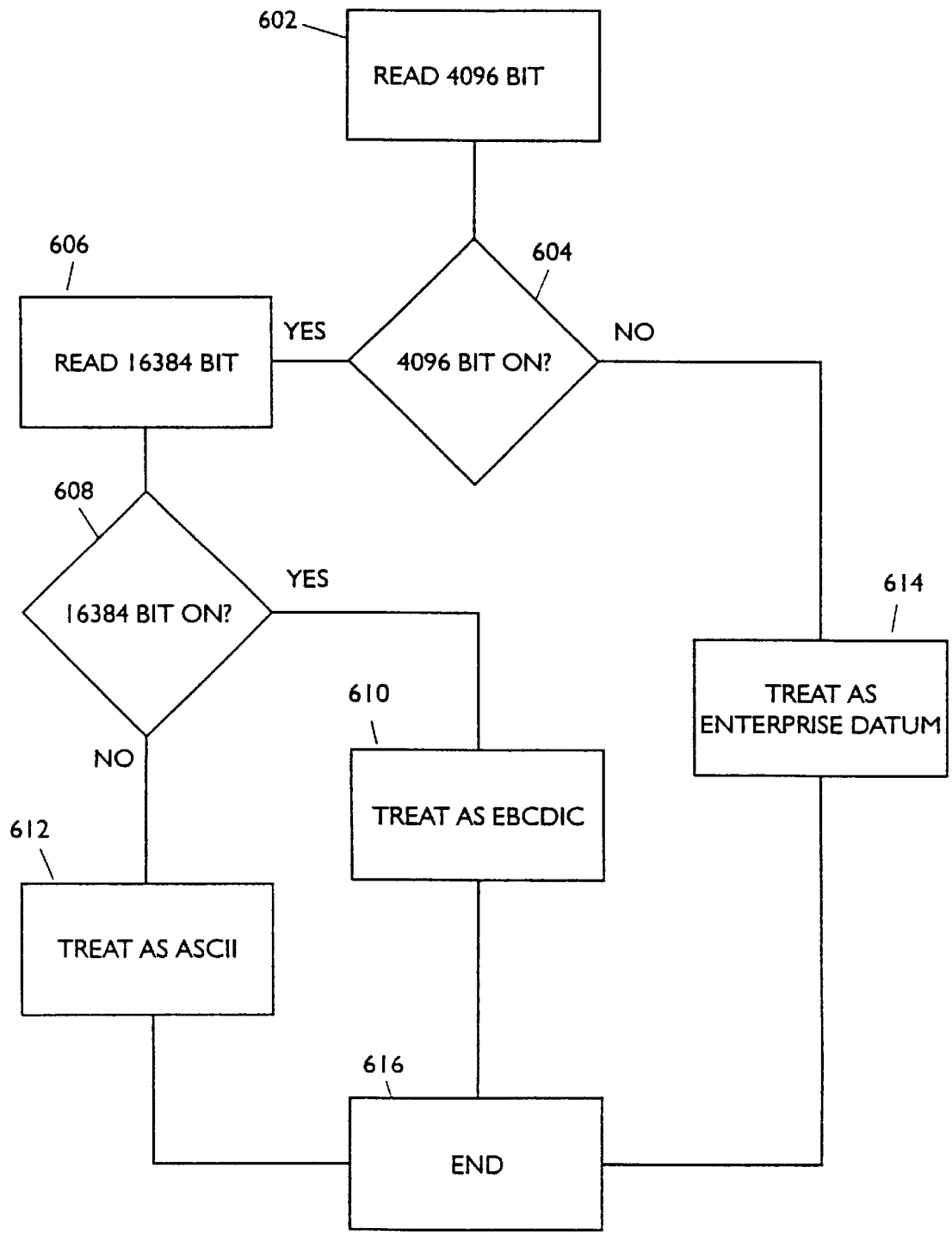
FIG. 6 is a flow chart showing the operation of reading a year in accordance with the second embodiment of the invention when legacy data can be in either of two formats.

An example of a process in which it is desirable to test more than one bit will now be explained with reference to FIG. 6. If it is necessary to check for legacy data in both ASCII and EBCDIC formats, both the 4,096 and 16,384 bits can be checked. More specifically, in step 602, the 4,096 bit is read, and a determination is made in step 604 whether the 4,096 bit is on. If so, in step 606, the 16,384 bit is read, and in step 608, it is determined whether the 16,384 bit is on. If the 16,384 bit is on, the datum is treated in step 610 as being in EBCDIC format; if not, the datum is treated in step 612 as being in ASCII format. If the 4,096 bit is off, of course, none of steps 606–612 is required, and the datum is treated in step 614 as an enterprise datum. Thus, the year can be determined accurately, and the process ends in step 616.

It will be readily apparent from the description above that if the use of the second embodiment is limited to years through 4095, and no offset is applied to the number representing any year, the four highest-order bits of any enterprise datum will be off (zero). Therefore, if any one of the four highest-order bits is on (one), the year datum is recognized as a legacy datum. If more than one legacy data format is in use, a bit or bits can be tested to determine which legacy data format is in use.

The testing of bits can be modified for other encoding schemes for the enterprise data. An example will be considered in which year data for all years 1900–1999 are encoded in the normal format (ASCII or EBCDIC) for legacy data, but years past 1999 are encoded using characters which are not necessarily digits, e.g., A0 for 2000, B0 for 2010, etc. In ASCII, the digits 0 through 9 are represented as bytes 0011 0000 through 0011 1001, so that the higher-order four bits are always 0011. However, the capital letters A through Z are represented as bytes 0100 0001 through 0101 1010, so that the higher-order four bits are either 0100 or 0101 (the gap between the ASCII representations of 9 and A being filled by various punctuation marks). Therefore, testing of the bit whose place value is 16,384 distinguishes between the ASCII representations of digits and those of capital letters. Of course, similar testing could be done on other ASCII characters or on characters in character sets other than ASCII. For example, such similar testing could be done on EBCDIC characters, in which case the bit or bits being tested are the bit or bits needed to distinguish the EBCDIC representations of numeric digits 0 through 9 from the EBCDIC representations of such other characters as are used to represent the enterprise data.

Still another possible encoding scheme for the enterprise data is called packed decimal encoding, in which each decimal digit is represented as a stream of four bits ranging from 0000 (zero) through 1001 (nine). Packed decimal encoding is traditionally used to represent the last two digits of a year in one eight-bit byte; in such a scheme, the year 1997 is represented by a bit stream 1001 0111. However, packed decimal encoding can also be used to represent four decimal digits of a year in two eight-bit bytes; for example, the year 1997 can be represented in two eight-bit bytes by a bit stream 0001 1001 1001 0111. Thus, for years one through 2999 encoded in such a two-byte packed decimal scheme, the highest-order four bits will be 0000, 0001 or 0010, whereas for legacy data encoded in ASCII, the highest-order four bits will be 0011. Accordingly, enterprise data for years one through 2999 will not conflict with legacy data encoded in ASCII. Enterprise data can be distinguished from legacy data by comparing the integer value of the year datum with the ranges for packed decimal data and for ASCII or by testing the 4,096 and 8,192 bits. If the legacy data are encoded only in EBCDIC, legacy and enterprise data can be distinguished in manners essentially similar to those just described, and enterprise data will be able to include representations of years well beyond 3000.

Figure 4:
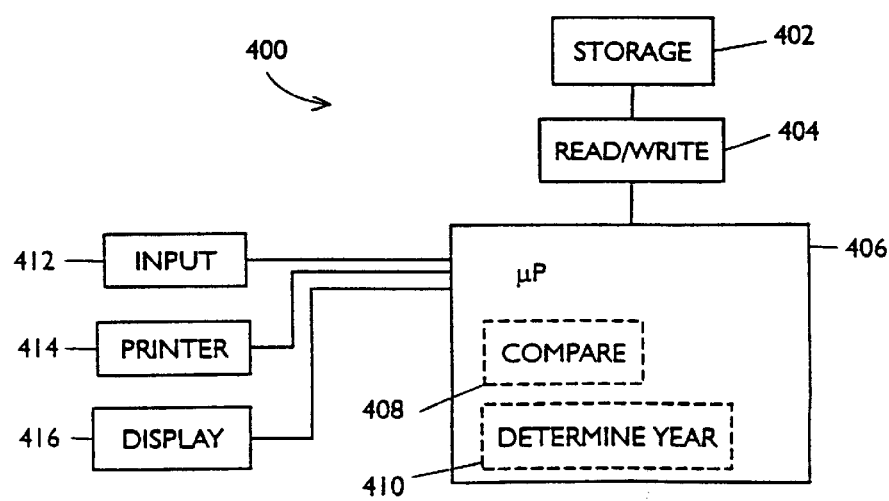
FIG. 4 shows a computing device in accordance with the invention.

Of course, the medium of FIG. 3 and the computing device of FIG. 4 are equally suitable for use with both embodiments.

The operations described above can be performed on any suitable computer with the appropriate programming or can be implemented in firmware, hard-wired configuration, microcode, or the like. The medium of FIG. 3 can be a floppy disk, a hard disk, ROM, RAM, a tape backup medium, or any other digital storage medium, as needed.

Examples of uses for the invention include the following. In a payment processing system at a bank, it is crucial to distinguish a payment due date in 2000 from one in 1900. Even commercial computer systems that do not process payments, such as airline reservation systems, frequently process date-sensitive information. Microcomputer applications, such as word processors and spreadsheets, often need to utilize information stored as date codes and thus need to be able to handle data representing all dates in which such applications will be used. This invention enables the date codes in the data base for the years 1900–1999 to remain the same, while storing dates codes for years 2000 and beyond in the binary integer format described above. The software for processing the dates codes need only be changed to include the capability of analyzing and processing date codes in both the integer-encoded format and the format involving years represented by the last two decimal digits.

While two embodiments of the invention have been described, those skilled in the art who have reviewed this specification will readily appreciate that other embodiments can be achieved. For example, the ranges or the bits tested can be varied to accommodate different character sets previously used to encode year data.

Also, the ranges that are unused in the first embodiment can be used to indicate years B.C. Alternatively, to indicate years B.C., the integer-encoded format can be encoded with a "minus" symbol by setting the highest-order bit to one, as is known in the art. Available negative integers include all negative integers not falling within the range described above for EBCDIC. If the year datum is tested by comparison with ranges, the ranges used are simply modified to take into account the possibility of years B.C. On the other hand, if the year datum is tested by testing one or more bits, the bit or bits tested are selected to allow for the possibility of years B.C. For example, if the legacy data are in ASCII, and the enterprise data for years B.C. are written in negative integer format, simply testing the highest-order bit suffices to distinguish the legacy data from the enterprise data for years B.C.

Furthermore, the integer value or packed decimal bit stream used to indicate the year can include an offset, so that the year 2000 can be written, say, as 0000 0000 0000 0000, thus making it possible to write an additional two thousand years. This variation does not require a change in the ranges used in the comparison or the bit or bits tested; instead, the routine used for interpreting the enterprise data merely has to add 2000 to the binary integer value to derive the year from the year datum.

Numbering systems other than binary or packed decimal, such as octal, can be used, although they decrease the practical range of years. If bit testing is used, the bits tested can be selected in accordance with any of these modifications.

Other variations exist for the invention, which should therefore be construed as limited only by the appended claims.

I claim:

1. A series of operational steps to be performed on or with the aid of a computer, said steps comprising:

(a) reading a year datum comprising two bytes from a computer-readable storage medium, the year datum representing a year;

(b) examining the year datum to determine whether the year datum comprises (i) a first representation of the year in a first encoding scheme in which each of the two bytes separately represents a decimal digit of the year or (ii) a second representation of the year in a second encoding scheme in which the two bytes together provide information for calculating at least four digits of the year when the year is 2000 or beyond;

(c) if the year datum comprises the first representation, determining the year from the year datum in accordance with the first encoding scheme; and (d) if the year datum comprises the second representation, determining the year from the year datum in accordance with the second encoding scheme.

2. A series of operational steps to be performed on or with the aid of a computer, said steps comprising:

(a) reading a date datum comprising six bytes from a computer-readable storage medium;

(b) examining the date datum to determine whether the date datum comprises (i) a first representation of the year in a first encoding scheme in which each of two bytes of said six bytes separately represents a decimal digit of the year or (ii) a second representation of the year in a second encoding scheme in which the second representation of the year provides information for calculating at least four digits of the year when the year is 2000 or beyond;

(c) if the date datum comprises the first representation, determining the year from the first representation in accordance with the first encoding scheme; and (d) if the date datum comprises the second representation, determining the year from the second representation in accordance with the second encoding scheme.

3. A method as in claim 2, wherein, in the first encoding scheme, the date datum includes no representation of the year other than the two bytes.

4. A series of operational steps to be performed on or with the aid of a computer, said steps comprising:

(a) reading a year datum from a computer-readable storage medium, the year datum representing a year;

(b) examining the year datum to determine whether the year datum comprises an EBCDIC representation of a year;

(c) if the year datum comprises the EBCDIC representation, determining the year from the year datum in accordance with the EBCDIC representation; and (d) if the year datum does not comprise the EBCDIC representation, determining the year from the year datum in accordance with an encoding scheme different from EBCDIC.

5. A series of operational steps to be performed on or with the aid of a computer, said steps comprising:

(a) reading a year datum from a computer-readable storage medium, the year datum representing a year;

(b) examining the year datum to determine (i) whether the year datum comprises an ASCII representation of a year and (ii) whether the year datum comprises an EBCDIC representation of the year;

(c) if the year datum comprises the ASCII representation, determining the year from the year datum in accordance with the ASCII representation;

(d) if the year datum comprises the EBCDIC representation, determining the year from the year datum in accordance with the EBCDIC representation; and (e) if the year datum does not comprise the ASCII representation or the EBCDIC representation, determining the year from the year datum in accordance with an encoding scheme different from both ASCII and EBCDIC.

6. A series of operational steps to be performed on or with the aid of a computer, said steps comprising:

(a) reading a year datum from a computer-readable storage medium, the year datum representing a year;

(b) examining the year datum to determine whether the year datum comprises an ASCII representation of a year;

(c) if the year datum comprises the ASCII representation, determining the year from the year datum in accordance with the ASCII representation; and (d) if the year datum does not comprise the ASCII representation, determining the year from the year datum in accordance with an encoding scheme different from ASCII.

* * * * *